United States Patent [19]

Kageyama et al.

[11] 4,264,754
[45] Apr. 28, 1981

[54] OLIGOMERS AND A METHOD FOR THE MANUFACTURE THEREOF

[75] Inventors: Akira Kageyama; Iwao Maekawa, both of Hitachi, Japan

[73] Assignee: Hitachi Chemical Company, Ltd., Tokyo, Japan

[21] Appl. No.: 103,034

[22] Filed: Dec. 13, 1979

[30] Foreign Application Priority Data

Dec. 18, 1978 [JP] Japan .................. 53-156998
Dec. 19, 1978 [JP] Japan .................. 53-157171

[51] Int. Cl.³ .......................... C08F 118/14
[52] U.S. Cl. .......................... 526/283; 260/5; 260/31.2 R; 260/32.8 R; 260/33.4 R; 260/33.6 UA; 428/441; 428/442; 560/194
[58] Field of Search .............. 526/283; 560/194

[56] References Cited

U.S. PATENT DOCUMENTS 2,389,136  11/1945  Bruson .................. 560/194

FOREIGN PATENT DOCUMENTS 49-4552  2/1974  Japan .

Primary Examiner—Stanford M. Levin

Attorney, Agent, or Firm—Gordon W. Hueschen

[57] ABSTRACT

An oligomer having, as the constitutional component thereof, (dihydrodicyclopentadienyl)-maleates or -fumarates of the general formula I:

R—OOCCH = CHCOO— 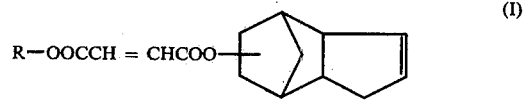 (I)

wherein, R is H or

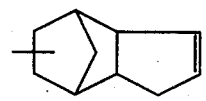

, and possessing a softening point in the range of from 50° to 180° C. and solubility in organic solvents. It is obtained by polymerizing the compound having the above general formula I under heating at a temperature of 220° to 300° C. in the absence of a catalyst.

19 Claims, No Drawings

OLIGOMERS AND A METHOD FOR THE MANUFACTURE THEREOF

BACKGROUND OF THE INVENTION

1. Field of the Invention

This invention relates to oligomers and to a method for the manufacture thereof, and more particularly to oligomers of (dihydrodicyclopentadienyl)-maleates or -fumarates and to a method for the manufacture of the oligomers.

2. Prior Art

From the disclosure of U.S. Pat. No. 3,084,147 it has been known to the art that a yellow resin having a high unsaturated bond content can be obtained by heating dicyclopentadiene at a temperature in the range of from 220° to 300° C. It has also been known to the art from the disclosure such as of Japanese Patent Publication No. 4552/1974, for example, that incorporation of a polar group into the polydicyclopentadiene obtained as described above is accomplished by subjecting this compound to a reaction with an α,β-unsaturated carboxylic acid or an anhydride thereof.

Another method available for the incorporation of a polar group into polydicyclopentadiene is based on a procedure which comprises the steps of mixing dicyclopentadiene, prior to the initiation of its polymerization, with a polymeric monomer possessing a polar group such as an α,β-unsaturated carboxylic acid, an unsaturated alcohol or vinyl phenol and subjecting the resultant mixture to thermal copolymerization at a temperature in the range of from 200° to 350° C. The methods touched upon above have been adopted widely in the art.

The purpose of the incorporation of a polar group into hydrocarbon resins such as polydicyclopentadiene resides in improving the compatibility of these hydrocarbon resins with high-molecular substances such as rubbers and synthetic resins with which the hydrocarbon resins are blended in the preparation of compositions and also enhancing such properties of the hydrocarbon resins as pigment-dispersing property, fluidity and adhesiveness which the hydrocarbon resins in their unmodified form fail to manifest easily.

An object of this invention, therefore, is to provide novel oligomers which possess excellent compatibility with high-molecular substances such as rubbers and synthetic resins and exhibit high solubility in various types of organic solvents.

Another object of this invention is to provide a method for manufacturing the aforementioned oligomers in high yields by a procedure capable of being easily carried out on an industrial scale.

SUMMARY OF THE INVENTION

The object described above are fulfilled by oligomers which have as the constituent component theeof (dihydrodicyclopentadienyl)-maleates or -fumarates of the general formula I:

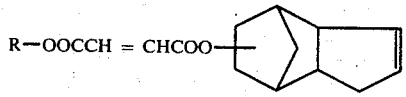
(I)

wherein, R is H or

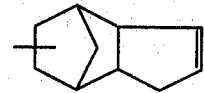

possess softening points in the range of from 50° to 180° C. and are soluble in organic solvents. The oligomers can be obtained by thermally polymerizing (dihydrodicyclopentadienyl)-maleates or -fumarates of the aforementioned general formula I at temperatures in the range of from 220° to 300° C. in the absence of a catalyst.

DESCRIPTION OF PREFERRED EMBODIMENTS

As described above, the oligomers of the present invention have as the constituent component thereof (dihydrodicyclopentadienyl)-maleates or -fumarates of the general formula I, possess softening points in the range of from 50° to 180° C. and are soluble in organic solvents.

In case where the substituent R in the general formula I is hydrogen atom, the oligomers to be obtained are acidic oligomers which have as the constituent units thereof mono-(dihydrodicyclopentadienyl)-maleate or -fumarate of the formula II:

(II)

possess number average molecular weights of from 400 to 2,000 and iodine values of from 60 to 102 and are soluble in ketone type solvents, ester type solvents and monohydric alcohol type solvents having from one to eight carbon atoms. The acidic oligomers which have as the constituent component thereof the compounds of the formula II show high compatibility with rubbers and synthetic resins of strong polarity and are soluble in polar solvents. It is believed that the high compatibility and solubility are ascribable to the carboxyl group possessed by the mono-(dihydrodicyclopentadienyl)-maleate or -fumarate.

In case where the substituent R in the general formula I is

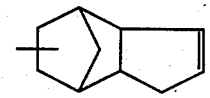

the oligomers to be obtained are oligomers which have as the constituent component thereof di-(dihydrodicyclopentadienyl)-maleate or -fumarate of the formula III:

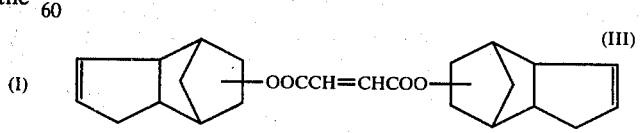
(III)

possess number-average molecular weights of from 500 to 2,000 and iodine values of from 75 to 134 and are soluble in aromatic hydrocarbon solvents, ketone solvents and ester solvents. The oligomers which have as the constituent component thereof the compounds of the formula III exhibit high compatibility with rubbers and synthetic resins. This high compatibility, it is believed, is ascribable to the presence of ester bonds within the molecule of di-(dihydrodicyclopentadienyl)-maleate or -fumarate.

These oligomers are manufactured, as described above, by thermally polmerizing (dihydrodicyclopentadienyl)-maleates or -fumarates of the aforementioned general formula I at temperatures in the range of from 220° to 300° C. in the absence of a catalyst.

According to this invention, the oligomers are obtained in high yields without entailing formation of any gel during the polymerization of the monomer, conceivably because the thermal polymerization producing the oligomers is carried out in a specific temperature range in the absence of a catalyst. If this polymerization is carried out in the presence of a radical polymerization catalyst, for example, it proceeds with inevitable formation of gel so serious as to make it difficult to produce the oligomer. It is estimated that the acidic oligomers of this invention which have the compounds of the formula II as the constituent component thereof contain ester groups in their main chains, whereas the oligomers which have the compounds of the formula III as the constituent component thereof contain ester groups not only in the side chains but also in the main chains. In this respect, these oligomers of the present invention are essentially different from the hydrocarbon resins and modified hydrocarbon resins heretofore known to the art.

The mono-(dihydrodicyclopentadienyl)-maleate to be used in this invention can be obtained by the ring-opening esterification such as of 5- or 6-hydroxy-3a, 4, 5, 6, 7, 7a-hexahydro-4,7-methanoindene (hydroxylated dicyclopentadiene) with maleic anhydride or by the acid addition reaction of dicyclopentadiene with maleic acid. In this case, dicyclopentadiene, maleic anhydride and water may be simultaneously charged in the reactor and subjected to the reaction, because the acid adition reaction substantially occurs after the formation of maleic acid. The di-(dihydrodicyclopentadienyl)-maleate can be obtained by subjecting 5- or 6-hydroxy-3a,4,5,6,7,7a-hexahydro-4,7-methanoindene (hydroxylated dicyclopentadiene) and maleic anhydride or maleic acid at a molar ratio of 2:1 to an esterification reaction or by the transesterification reaction between hydroxylated dicyclopentadiene and a dialkyl maleate.

During the reactions mentioned above, the isomerization of the cis maleoyl group to the trans fumaroyl group may possibly be entailed. The presence or absence of this isomer of the proportion of the isomer to be contained in the reaction system has no effect whatever upon the oligomer to be manufactured by this invention. This means that, in the present invention, mono-(dihydrodicyclopentadienyl) -fumarate can be used quite similarly to mono-(dihydrodicyclopentadienyl)-maleate. By the same token, di-(dihydrodicyclopentadienyl)-fumarate can be used in this invention quite similarly to di-(dihydrodicyclopentadienyl)-maleate. This di-(dihydrodicyclopentadienyl)-fumarate can be obtained as by the esterification reaction of hydroxylated dicyclopentadiene and fumaric acid.

Now, the properties of the oligomers to be manufactured by this invention will be described. The oligomers described above invariably possess softening points in the range of from 50° to 180° C. and are soluble in organic solvents. Of these oligomers, the acidic oligomers which have the compounds of the formula II as the repeating unit thereof have number-average molecular weights of from 400 to 2,000, preferably from 500 to 1,500. When the number-average molecular weight is less than 400, the oligomer abounds with low-molecular components and emits objectionable odor and, because of its waxy constitution and heterogeneous composition, proves unsuitable for the intended applications. When the number-average molecular weight exceeds 2,000, the oligomer is degraded in compatibility with rubbers and synthetic resins and solubility in solvents and, therefore, proves unsuitable. The acid oligomers have softening points in the range of from 50° to 180° C., preferably from 60° to 150° C. The reason for the limitation of the softening point to the range mentioned above is similar to the reason for the limitation of the number-average molecular weight touched upon above.

The acidic ologomers mentioned above have iodine values of from 60 to 102. When the iodine value is less than 60, the oligomer, because of its deficiency in the reactive unsaturated bond content, shows no sufficient effect in the improvement of rubbers and synthetic resins, tends to entail formation of gel in the course of polymerization and proves unsuitable. The upper limit 102 of the iodine value corresponds to the iodine value of mono-(dihydrodicyclopentadienyl)-maleate and mono-(dihydrodicyclopentadienyl)-fumarate which are starting monomers for the oligomers of this invention. From the practical point of view, therefore, it is not possible for any acidic oligomer produced by the present invention to acquire an iodine value exceeding 102 under any conditions.

Further, the acidic oligomers are soluble in ketone solvents, ester solvents and monohydric alcohol solvents having from one to eight carbon atoms and produce no insolubles in these solvents. Specific examples of solvents in which the acidic oligomrs are soluble include acetone, methyl ethyl ketone, methyl isobutyl ketone, cyclohexanone, methyl acetate, ethyl acetate, n-propyl acetate, isopropyl acetate, butyl acetate, $\gamma$-valerolactone, benzyl acetate, methanol, ethanol, isopropanol, n-propanol, n-butanol, isobutanol, sec-butanol, and 2-ethylhexanol. The specially high solubility in methanol constitutes itself one of the remarkable characteristics of the acidic oligomers of the present invention.

The oligomers which have the compound of the formula III as the constituent component thereof hve number-average molecular weights of from 500 to 2,000, preferably from 550 to 1,500. When the number-average molecular weight is less than 500, the oligomer abounds in low-molecular components and emits objectionable odor and, because of its viscous liquid constitution, proves unsuitable for the intended applications. When the number-average molecular weight exceeds 2,000, the oligomer again proves unsuitable because it is deficient in compatibility with rubbers and synthetic resins and solubility in solvents. These oligomers have softening points in the range of from 50° to 180° C., preferably from 60° to 150° C. The reason for the limitation of the softening point to this particular range is similar to that for the limitation of the number-average molecular weight mentioned above.

The oligomers have iodine values of from 75 to 134. When the iodine value is less than 75, the oligomer, because of its deficiency in the reactive unsaturated bond content, manifests no sufficient effect in the improvement of rubbers and synthetic resins, tends to entail formation of gel in the course of polymerization and proves unsuitable. The upper limit 134 of the iodine value corresponds to the iodine value of di-(dihydrodicyclopentadienyl)-maleate and di-(dihydrodicyclopentadienyl)-fumarate which are starting monomers for the oligomers of this invention. From the practical point of view, therefore, it is not possible for any oligomer produced by this invention to acquire an iodine value exceeding 134 under any conditions.

Further, the oligomers of this invention are soluble in aromatic hydrocarbon solvents, ketone solvents and ester solvents and produces no insolubles in these solvents. Specific examples of solvents in which the oligomer is soluble include benzene, toluene, xylene, acetone, methyl ethyl ketone, methyl isobutyl ketone, cyclohexanone, methyl acetate, ethyl acetate, n-propyl acetate, isopropyl acetate, butyl acetate, γ-valerolactone and benzyl acetate.

Now, the method by which the oligomers of the present invention are manufactured will be described. In the present invention, the polymerization temperature is limited to the range of from 220° to 300° C., preferably from 230° to 280° C. When the temperature is less than 220° C., the production of an oligomer possessing a desired molecular weight consumes much greater time than is normally tolerated and the reaction itself fails to proceed stably and affords barely a product which frequently turns out to be a waxy low-molecular substance or viscous, liquid low-molecular substance. The polymerization temperature exceeding 300° C. proves unsuitable because, beyond this upper limit, the product of the polymerization is heavily tinted and contains an insoluble gel. The polymerization reaction does not require use of a radical or non-radical catalyst. Although the reaction time is desired to fall in the range of from 0.5 to 20 hours, it is not required to be specifically limited. The polymerization reaction proceeds without the presence of a catalyst, and the boiling points of mono-(dihydrodicyclopentadienyl)-maleate, mono-(dihydrodicyclopentadienyl)-fumarate, di-(dihydrodicyclopentadienyl)-maleate and di-(dihydrodicyclopentadienyl)-fumarate which are starting monomers for the oligomers of the present invention are invariably over 250° C. The polymerization reaction, therefore, can be effectively carried out even under the atmospheric pressure. Optionally, it may be performed in a closed reactor at the prescribed temperature under the self-generated pressure due to the polymerization temperature, by using a solvent such as methyl ethyl ketone or acetone in the case of the acid oligomer having the compound of the formula II as the repeating unit or a solvent such as toluene or xylene in the case of the oligomer having the compound of the formula III as the repeating unit. Desirably, prior to the polymerization reaction, the interior of the reaction system may be displaced with an inert gas such as nitrogen so that the oligomer to be consequently produced will be prevented from otherwise possible coloration or decomposition.

On completion of the polymerization reaction, the oligomer aimed at can be obtained from the produced reaction mixture by removing from the reaction mixture the unaltered reactants, low-molecular reaction products and spent solvent by distillation or some other suitable means widely adopted in the art for the isolation of high-molecular products.

The oligomers of the present invention produced as described above can be used for various applications. For example, they are highly useful as ingredients for paints, printing inks, pressure-sensitive adhesives, other adhesives and the like. In addition, the acidic oligomers having the compound of the formula II as the repeating unit can be used as ingredients for nitrile rubber and other rubbers having strong polarity. Further, as alicyclic polycarboxylic acids, the acidic oligomers can be advantageously used in the form of a starting material for various synthetic resins.

Now, the present invention will be described specifically with reference to working examples, which are not limitative of this invention in any way. The properties of oligomers described in the following examples were detrmined by the following methods.

Hue—This was determined by the Gardner Method using a molten sample of a given oligomer.

Softening point—This was determined by the ring and ball method in accordance with Japanese Industrial Standard (hereinafter abbreviated as "JIS") K 2531.

Acid number—This was determined in accordance with JIS K 0070.

Iodine value—This was determined in accordance with JIS K 0070.

Number-average molecular weight—This was determined by the vapor pressure equilibrium method using acetone as the solvent.

Solubility in solvent—This was determined by a procedure comprising the steps of adding a given solvent to a sample oligomer to an oligomer concentration of 30% by weight, shaking the resultant mixture at 25° C. for 30 minutes and analyzing the resultant solution.

EXAMPLE 1

In an autoclave made of stainless steel and having an inner volume of 1 liter, 500 g of mono-(dihydrodicyclopentadienyl)-maleate was charged and sealed in by closing the autoclave lid, with nitrogen gas subsequently introduced into the autoclave to displace the gas phase present inside. Then, the autoclave was heated to 250° C. and shaken at this temperature for five hours to effect polymerization of the monomer. Thereafter, the autoclave was cooled to 150° C. The contents of the autoclave were removed and transferred into a 1-liter four-necked flask fitted with a stirrer, a thermometer and a nitrogen inlet tube. The reaction mixture in the flask was heated to 180° C. and, while being swept with a continuous current of nitrogen, held at that temperature under vacuum to expel low-molecular reaction products through distillation and isolate an oligomer. The properties of this oligomer were as shown in Table 1.

EXAMPLE 2

In the same autoclave as used in Example 1, 400 g of mono-(dihydrodicyclopentadienyl)-maleate and 200 g of methyl isobutyl ketone were charged. Then, polymerization of the monomer was effected at 240° C. for six hours by following the procedure of Example 1. Thereafter, the autoclave was cooled to room temperature. The reaction mixture was then removed from the autoclave and transferred into the same 1-liter four-necked flask. In the flask, it was heated to 150° C. to expel methyl isobutyl ketone through distillation and further heated to 180° C. and, while being swept with a continuous cirrent of nitrogen, held at that temperature under vacuum to expel low-molecular reaction products through distillation. Consequently there was obtained an oligomer the properties of which were as shown in Table 1.

EXAMPLE 3

In a 1-liter four-necked flask fitted with a stirrer, a reflux condenser, a thermometer, and a nitrogen inlet tube, 600 g of mono-(dihydrodicyclopentadienyl)-maleate was charged, heated to 210° C. while being swept with a continuous current of nitrogen and continuously stirred, held at that temperature for three hours to effect polymerization of the monomer and, thereafter, heated to 240° C. and held at this temperature for five hours to undergo a further reaction. After the reaction, the reaction mixture was cooled to 180° C. and, with the reflux condenser replaced with a vacuum distillation receptable, subjected to vacuum distillation to effect expulsion of low-molecular reaction products through distillation. The properties of the oligomer consequently obtained were as shown in Table 1.

TABLE 1

| | Example | | |
|---|---|---|---|
| Item | 1 | 2 | 3 |
| Yield (in %) | 94 | 96 | 88 |
| Hue (by Gardner scale) | 10 | 6 | 9 |
| Softening point (°C.) | 105 | 95 | 98 |
| Acid number | 198 | 214 | 221 |
| Iodine value | 74 | 82 | 75 |
| Number-average molecular weight | 610 | 570 | 540 |
| Solubility in: Methanol | o | o | o |
| Acetone | o | o | o |
| Ethyl acetate | o | o | o |

(Note)
The circle (o) denotes that the solubility of a given oligomer was so high as to produce a clear solution.

Comparative Example 1

The procedure of Example 1 was repeated, except that the reaction temperature was changed to 200° C. After the reaction, the reaction mixture was treated as in Example 1 to expel low-molecular reaction products through distillation. The remaining solution, on being cooled to room temperature, produced a cloudy, viscous slurry, which was totally different from the transparent oligomer obtained in Example 1. This product, on analysis, was found to have a number-average molecular weight of 290, indicating that substantially no polymerization had occurred on the monomer.

Comparative Example 2

In the same apparatus as used in Example 1, 400 g of mono-(dihydrodicyclopentadienyl)-maleate, 4 g of dicumyl peroxide, and 200 g of methyl isobutyl ketone were charged and heated at 180° C. for five hours to effect polymerization. After the heating, the autoclave was cooled. The reaction mixture in the autoclave, an analysis, was found to contain a large amount of gel formed in the course of heating. No soluble oligomer such as was obtained in Example 1 was produced.

Referential Example A

To test the oligomers obtained in Examples 1 and 2 for compatibility with various high-molecular substances, the samples of a given oligomer and a varying high-molecular substance were mixed at a ratio of 1:1 and the resultant mixture was dissolvec in a mixture solvent consisting of benzene and methyl ethyl ketone at a ratio of 2:1 to produce a 10% solution. This solutin was spread on a transparent glass palte and allowed to dry up to leave behind a film, which was rated for turbidity by visual examination. The results are shown in Table 2. The high-molecular substances used in this test were as shown below.

Ethylene-vinyl acetate copolymer—Everflex 210 made by Mitsui Polychemical Kabushiki Kaisha Vinyl chloride-vinyl acetate copolymer—Danka Vinyl 1000 MT made by Denki Kagaku Kogyo Kabushiki Kaisha Butadiene-acrylonitrile rubber—Nypol 1432J made by the Japanese Geon Co., Ltd.

Natural rubber with Mooney viscosity of 55.

Epoxy resin—Epicoat 828 made by Shell Chemical Company.

TABLE 2

| | Example | |
|---|---|---|
| High-molecular substance | 1 | 2 |
| Ethylene-vinyl acetate copolymer | x | x |
| Vinyl chloride-vinyl acetate copolymer | o | o |
| Butadiene-acrylonitrile rubber | o | o |
| Natural rubber | x | x |
| Epoxy resin | o | o |

(Note)
o: High compatibility and no turbidity
x: Deficient compatibility and heavy turbidity of film The acidic oligomers produced by the present invention are useful as modifiers for rubbers and synthetic resins which possess particularly strong polarity. Specifically, they can be used in the class of products such as rubbers, paints, printing inks, pressure-sensitive adhesives and other adhesives which at present relay exclusively on rosins, rosin esters and polyterpenes.

Further, being alicyclic polycrboxylic acids, the acid oligomers of the present invention can be used as starting materials for synthetic resins such as alkyl resins, polyester resins, and polyamide resins and also as ingredients for blending with such resins. They, thus, find utility in a wide variety of applications.

EXAMPLE 4

In an autoclave made of stainless steel and having an inner volume of 1 liter, 500 g of di-(dihydrodicyclopentadienyl)-maleate was charged and sealed in by closing the autoclave lid, with nitrogen gas subsequently introduced into the autoclave to displace the gas phase present inside. The autoclave ws then heated to 250° C. and shaken at that temperature for five hours to effect polymerization of the monomer. Thereafter, the autoclave was cooled to 150° C. The reaction mixture was removed from the autoclave and transferred into a 1-liter four-necked flask fitted with a stirrer, a thermometer, and a nitrogen inlet tube. In the flask, the reaction mixture was heated to 180° C. and, while being swept with a continuous current of nitrogen, held at that temperature under vacuum to expel low-molecular reaction products through distillation and isolate an oligomer. The properties of this oligomer were as shown in Table 3.

EXAMPLE 5

In the same autoclave as used in Example 4, 400 g of di-(dihydrodicyclopentadienyl)-maleate and 200 g of xylene were charged. Then, polymerization of the monomer was effected at 240° C. for five hours by following the procedure of Example 4. Thereafter, the autoclave was cooled to room temperature. The reaction mixture was then removed from the autoclave and transferred into the same 1-liter four-necked flask as in Example 4. In the flask, it was heated to 150° C. to expel xylene through distillation and further heated to 180° C. and, while being swept with a continuous current of nitrogen, held at that temperature under vacuum to expel low-molecular reaction products through distillation. Consequently there was obtained an oligomer the properties of which were as shown in Table 3.

EXAMPLE 6

In a 1-liter four-necked flask fitted with a stirrer, a reflux condenser, a thermometer, and a nitrogen inlet tube, 600 g of di-(dihydrodicyclopentadienyl)-maleate was charged, heated to 230° C. while being swept with a continuous current of nitrogen and continuously stirred, held at that temperature for two hours to effect polymerization of the monomer and, thereafter, heated to 245° C. and held at this temperature for three hours to undergo a further reaction. After the reaction, the reaction mixture was coolec to 180° C. and, with the reflux condenser replaced with a vacuum distillation receptable, subjected to vacuum distillation to effect expulsion of low-molecular reaction produces through distillation. The properties of the oligomer consequently obtained were as shown in Table 3.

Comparative Example 3

The procedure of Example 4 was repeated, except that the reaction temperature was changed to 200° C. After the reaction, the reaction mixture was treated as in Example 4 to expel low-molecular reaction products through distillation. The remaining solution, on being cooled to room temperature, failed to solidify and gave birth to a viscous liquid. This product, on analysis, was found to have a number-average molecular weight of 430, indicating that substantially no polymerization had occurred on the monomer.

Comparative Example 4

In the same apparatus as used in Example 4, 400 g of di-(dihydrodicyclopentadienyl)-maleate, 4 g of dicumyl peroxide, and 200 g of xylene were charged and heated at 180° C. for five hours to effect polymerization. After the heating, the atuoclave was cooled. The reaction mixture in the autoclave, on analysis, was found to contain a large amount of gel formed in the course of heating. No soluble oligomer such as was obtained in Example 4 was produced.

TABLE 3

| Item | Example | | |
|---|---|---|---|
| | 4 | 5 | 6 |
| Yield (in %) | 92 | 95 | 90 |
| Hue (by Gardner scale) | 8 | 5 | 7 |
| Softening point (°C.) | 94 | 89 | 90 |
| Iodine value | 101 | 93 | 96 |
| Number-average molecular weight | 880 | 820 | 800 |
| Solubility in: Toluene | o | o | o |
| Acetone | o | o | o |
| Ethyl acetate | o | o | o |

(Note)
The circle (o) denotes that the solubility of a given oligomer was so high as to produce a clear solution.

Referential Example B

To test the oligomers obtained in Examples 4 and 5 for compatibility with various high-molecular substances, the samples of a given oligomer and a varying high-molecular substance were mixed at a ratio of 1:1 and the resultant mixture was dissolved in benzene to produce a 10% solution. This solution was spread on a transparent glass plate and allowed to dry up to leave behind a film, which was rated for turbidity by visual examination. The high-molecular substances used in this test were as shown below.

Ethylene-vinyl acetate copolymer—Everflex 210 made by Mitsui Polychemical Kabushiki Kaisha Vinyl chloride-vinyl acetate copolymer—Denka Vinyl 1000 MT made by Denki Kagaku Kogyo Kabushiki Kaisha Natural rubber with Mooney viscosity of 55.

Styrene-isoprene block copolymer—Califlex TR-1107 made by Shell Chemical Company.

Epoxy resin—Epicoat 828 made by Shell Chemical Company.

The results are shown in Table 4.

TABLE 4

| High-molecular substance | Example | |
|---|---|---|
| | 4 | 5 |
| Ethylene-vinyl acetate copolymer | o | o |
| Vinyl chloride-vinyl acetate copolymer | o | o |
| Natural rubber | o | o |
| Styrene-isoprene block copolymer | o | o |
| Epoxy grsin | o | o |

(Note)
o: High compatibility and no turbidity
x: Rather poor compatibility and slight turbidity The novel oligomers produced by the present invention are useful as modifiers for rubbers and synthetic resins. Specifically, they can be used in the class of products such as rubbers, paints, printing inks, pressure-sensitive adhesives and other adhesives which at present relay exclusively on natural resins such as rosins, rosin esters and polyterpenes and on synthetic resins such as hydrocarbon resins containing polar groups.

What is claimed is:

1. An oligomer having, as the constituent component theeof, (dihydrodicyclopentadienyl)-maleates or -fumarates of the general formula I:

$$R-OOCCH = CHCOO-\text{[dihydrodicyclopentadienyl]}$$ (I)

wherein, R is H or

[dihydrodicyclopentadienyl group], and possessing a softening point in the range of from 50° to 180° C. and solubility in organic solvents.

2. The oligomer according to claim 1, wherein the softening point falls in the range of from 60° to 150° C.

3. The oligomer according to claim 1, wherein the substituent R in the general formula I is H and the oligomer possesses a number-average molecular weight of from 400 to 2,000 and an iodine value of from 60 to 102.

4. The oligomer according to claim 3, wherein the organic solvents in which the oligomer is soluble are ketone solvents, ester solvents and monohydric alcohol solvents having one to eight carbon atoms.

5. The oligomer according to claim 4, wherein the number-average molecular weight falls in the range of from 500 to 1,500.

6. The oligomer according to claim 1, wherein the substituent R in the general formula I is

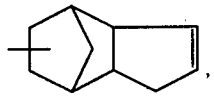

and the oligomer possesses a number-average molecular weight of from 500 to 2,000 and an iodine value of from 75 to 134.

7. The oligomer according to claim 6, wherein the organic solvents in which the oligomer is soluble are aromatic hydrocarbon solvents, ketone solvents and ester solvents.

8. The oligomer according to claim 7, wherein the number-average molecular weight falls in the range of from 550 to 1,500.

9. A method for manufacture of an oligomer having, as the constituent component thereof, the compound of the general formula I,

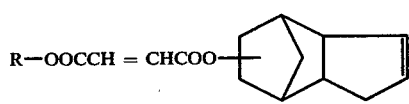

wherein, R is H or

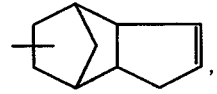

and possesing a softening point in the range of from 50° to 180° C. and solubility in organic solvents, which method comprises thermally polymerizing (dihydrodicyclopentadienyl)-maleate or -fumarate of the general formula I at a temperature in the range of from 220° to 300° C. in the absence of a catalyst.

10. The method according to claim 9, wherein the polymerization temperature falls in the range of from 230° to 280° C.

11. The method according to claim 9, wherein the polymerization reaction is carried out in the absence of a solvent.

12. The method according to claim 9, wherein the polymerization reaction is carried out in the presence of a solvent.

13. The method according to claim 9, wherein the oligomer has a softening point in the range of from 60° to 150° C.

14. The method according to claim 9, wherein the substituent R in the general formula I is H and the oligomer has a number-average molecular weight of from 400 to 2,000 and an iodine value of from 60 to 102.

15. The method according to claim 14, wherein the organic solvents in which the oligomer is soluble are ketone solvents, ester solvents and monohydric alcohol solvents having from one to eight carbon atoms.

16. The method according to claim 15, wherein the oligomer has a number-average molecular weight of from 500 to 1,500.

17. The method according to claim 9, wherein the substitutent R in the general formula I is

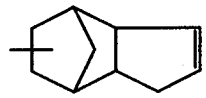

and the oligomer has a number-average molecular weight of from 500 to 2,000 and an iodine value of from 75 to 134.

18. The method according to claim 17, wherein the organic solvent in which the oligomer is soluble are aromatic hydrocarbon solvents, ketone solvents, and ester solvents.

19. The method according to claim 18, wherein the oligomer has a number-average molecular weight of from 550 to 1,500.

* * * * *

UNITED STATES PATENT AND TRADEMARK OFFICE
CERTIFICATE OF CORRECTION

PATENT NO. : 4,264,754
DATED : April 28, 1981
INVENTOR(S) : Akira Kageyama and Iwao Maekawa It is certified that error appears in the above-identified patent and that said Letters Patent are hereby corrected as shown below:

[56] References Cited, FOREIGN PATENT DOCUMENTS, after "Japan ." should be inserted "Katanosaka, et al."  Attachment to paper 6 dated August 4, 1980, Notice of References Cited, Foreign Patent Documents, L, under name.

Col. 1, line 58; "theeof" should read -- thereof --
Col. 3, line 9; "polmerizing" should read -- polymerizing --
Col. 3, line 53; "of" (second occurrence) should read -- or --
Col. 4, line 19; "ologomers" should read -- oligomers --
Col. 6, line 5; "ologomers" should read -- oligomers --
Col. 6, line 16; "detrmined" should read -- determined --
Col. 6, line 67; "cirrent" should read -- current --
Col. 7, line 55; "an" should read -- on --
Col. 7, line 65; "dissolvec" should read -- dissolved --
Col. 7, line 67; "solutin" should read -- solution --
Col. 7, line 68; "palte" should read -- plate --
Col. 8, line 34; "polycrboxylic" should read -- polycarboxylic --
Col. 8, line 48; "ws" should read -- was --
Col. 9, line 20; "coolec" should read -- cooled --
Col. 9, line 23; "produces" should read -- products --
Col. 10, line 26 (last line in Table 4); "Epoxy grsin" should read -- Epoxy resin --
Col. 10, line 41; "theeof" should read -- thereof --
Col. 11, line 41; "possesing" should read -- possessing --

Signed and Sealed this

Twenty-fifth Day of August 1981

[SEAL]

Attest:

Attesting Officer

GERALD J. MOSSINGHOFF

Commissioner of Patents and Trademarks